United States Patent [19]

Watkins

[11] Patent Number: 4,919,613

[45] Date of Patent: Apr. 24, 1990

[54] METHOD AND APPARATUS FOR CALCINATION

[75] Inventor: David W. Watkins, Nottingham, United Kingdom

[73] Assignee: BPB Industries Public Limited Company, Slough, United Kingdom

[21] Appl. No.: 307,251

[22] Filed: Feb. 7, 1989

[30] Foreign Application Priority Data

Feb. 8, 1988 [GB] United Kingdom ............... 8802765

[51] Int. Cl.$^5$ ........................... F27B 15/00; B01J 8/18
[52] U.S. Cl. ..................................... 432/58; 110/245; 422/142
[58] Field of Search ..................... 432/58, 15; 110/245

[56] References Cited

U.S. PATENT DOCUMENTS

| 4,247,518 | 1/1981 | Charlet et al. | 422/142 |
| 4,338,283 | 7/1982 | Sakamoto et al. | 432/58 |
| 4,455,285 | 6/1984 | Watkins et al. | 423/171 |
| 4,517,162 | 5/1985 | Moss | 432/58 |
| 4,615,867 | 10/1986 | Heckmann | 432/58 |

FOREIGN PATENT DOCUMENTS

| 2622994 | 12/1976 | Fed. Rep. of Germany . |
| 153755 | 6/1932 | Switzerland . |
| 1508777 | 4/1978 | United Kingdom . |
| 1549030 | 7/1979 | United Kingdom . |
| 2027859 | 2/1980 | United Kingdom . |
| 2140702 | 12/1984 | United Kingdom . |

Primary Examiner—Henry C. Yuen
Attorney, Agent, or Firm—Birch, Stewart, Kolasch & Birch

[57] ABSTRACT

In a method and apparatus for the heat treatment of gypsum or like heat material, in which the material is heated in a vessel by indirect heat exchange with hot gas produced by the fluidized combustion of a fuel, material is fed into a first fluidized bed of the material. Partially treated material is removed from the lower region of the first bed and introduced with the assistance of compressed air into the upper region of a second fluidized bed. Treated material is removed from the second bed. The beds of material are both fluidized by means of the introduction of the hot gas product of the fluidized combustion bed, further heating the beds. The first bed may be operated at a lower temperature than the second bed, although both beds may receive substantially the same heat input.

5 Claims, 2 Drawing Sheets

METHOD AND APPARATUS FOR CALCINATION

BACKGROUND OF THE INVENTION

The present invention relates to a method and apparatus for calcination, and more especially to a method and apparatus for calcining calcium sulphate dihydrate or gypsum, and similarly heat-reactive minerals.

A method and apparatus for calcining gypsum is described in GB No. 2 027 859, in which a single bed of gypsum is heated by indirect heat exchange with burning fuel in a fluidized bed combustion unit and the gypsum is simultaneously fluidized and directly heated by the resulting combustion gases. We have found that hemihydrate obtained by this process requires the use of substantial quantities of a retarding agent to adjust the setting time to a convenient value for building plaster formulations.

In addition, we have found that some of the gypsum fed to the treatment bed of the single stage calciner described in GB No. 2 027 859 tends to pass from the inlet directly to the outlet with the result that a significant proportion of the gypsum leaves the calciner untreated and persists as dihydrate in the product. Paradoxically, some material tends to be retained in the bed for prolonged periods and this leads to the formation of soluble anhydrous calcium sulphate which again emerges in the product. Both of these by products reduce the quality of the stucco produced.

SUMMARY OF THE INVENTION

According to a first aspect of the present invention there is now provided an improved method of calcining calcium sulphate dihydrate or other heat-reactive material which comprises establishing at least two beds of the material, feeding the material to a first of the beds, transferring it therefrom to a second bed and removing it from the latter, heating the material in the beds by indirect heat exchange with a hot gas, and fluidizing the material in the beds by introduction of the same hot gas after it has transferred some of its heat to the beds by indirect heat exchange.

The hot gas may be produced by fluidized bed combustion of a solid fuel, for example coal, or a liquid fuel, for example heavy oil, and the entire fluidized bed combustion unit is preferably in indirect heat exchange relationship with the beds of material.

The overall rate of the calcination reaction is reduced in comparison with the single stage calcination process. We have found that the resulting product requires less retarder to be used, as compared with the product of the single stage process, to achieve the setting time required for an acceptable plaster formulation.

In addition, the multi-stage process results in a more even heat-treatment of the gypsum and reduces the proportions of dihydrate and of soluble anhydrite in the product. The efficiency of the calcination process is, therefore, increased and the quality of the product improved. The product of the invention has properties suitable for the manufacture of plasterboard.

According to a second aspect of the present invention there is provided apparatus which comprises a series of containers for containing beds of material to being calcined, means for feeding material into a first container of the series, means for transferring material from the first container to a second container, means for removing calcined product from the last container of the series, ducting for hot gas in indirect heat exchange relationship with the first and second containers, and means for introducing the hot gas from the ducting into the lower regions of the containers for fluidization of the beds therein.

BRIEF DESCRIPTION OF THE DRAWINGS

The invention will now be described, by way of example only, with reference to the accompanying drawings in which.

DESCRIPTION OF THE PREFERRED EMBODIMENTS

Figure 1:
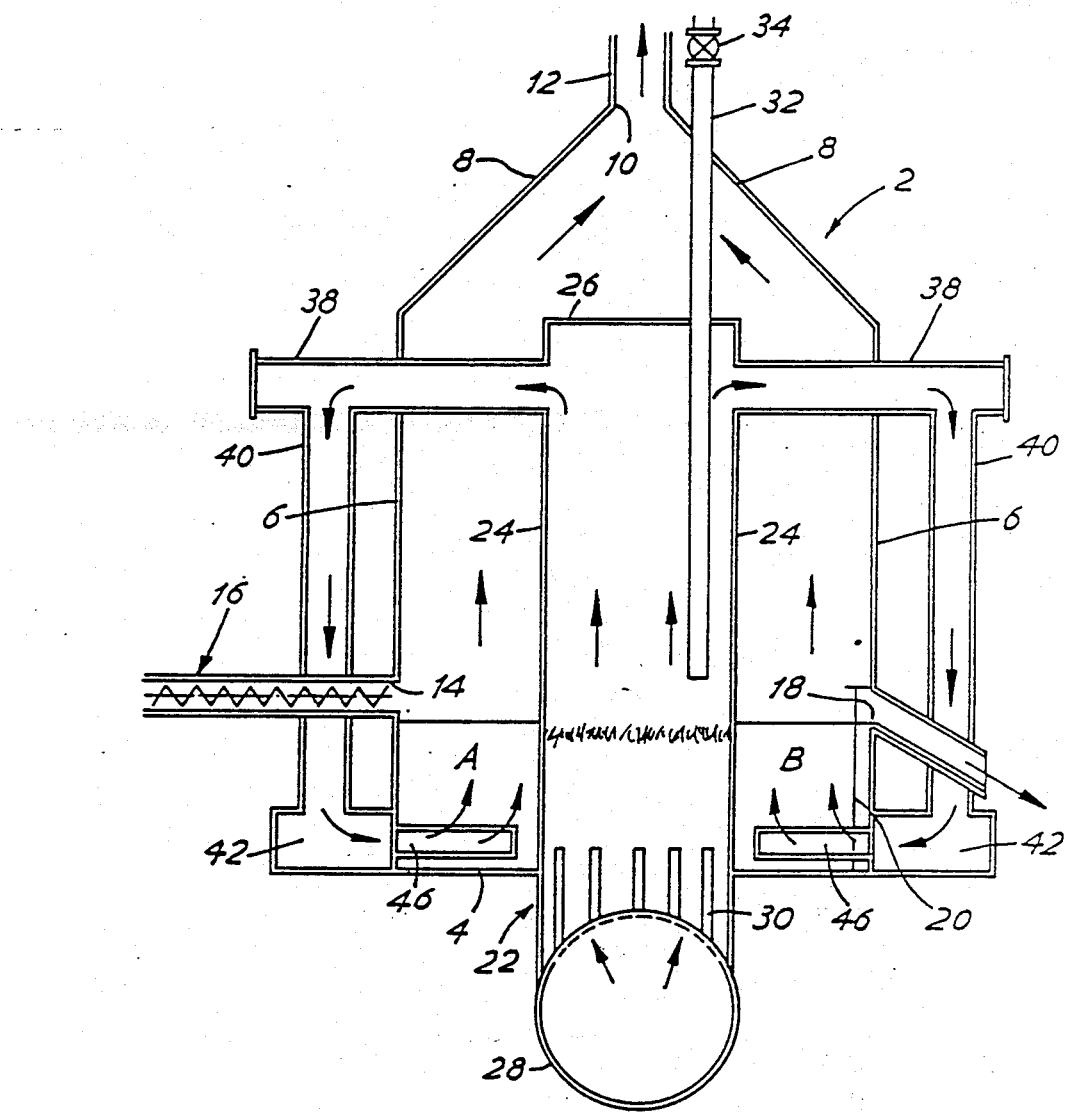
FIG. 1 is a vertical calcination apparatus in accordance with the invention.

The calcination apparatus shown in FIG. 1 comprises a steel vessel 2 having a rectangular base 4, two side walls 6 and two end walls not shown in the drawing. The vessel is provided with a sloping roof 8, extending from the upper edge of the side walls 6. At the apex of the roof is an outlet 10 for exhaust gases from which an exhaust duct 12 extends upwardly.

An inlet 14 in one of the side walls 6 is provided for the entry of powdered gypsum to be calcined, which is supplied by means of a conventional screw feed 16. An outlet weir 18 for the calcined product material is provided in the opposite side wall. A baffle plate 20 spaced from the side wall at the outlet extends vertically downwards within the vessel 2 to a level near the base 4. This ensures that material reaching the outlet weir is drawn from the lower region of the vessel 2.

The apparatus further comprises a combustion chamber 22, formed of two thermally conductive heat-exchange side walls 24, two end walls (not shown in FIG. 1), and a horizontal roof 26. The combustion chamber is disposed symmetrically in the center of the vessel 2 and, together with partition walls (not shown in FIG. 1) that extend from the chamber 22 to the end walls of the vessel 2, divides the latter into two compartments A and B, which serve as containers for the beds of material being calcined.

The lower portions of the side walls 24 extend downwards beyond the base 4 and are sealed to the wall of a horizontal gas supply tube 28 arranged longitudinally beneath the vessel 2. The upper portion of the wall of the gas supply tube is provided with a plurality of stand pipes 30 to allow gas from the gas feed tube 28 to enter the combustion chamber 22. A feed pipe 32 for coal extends vertically downwards through the roof 8 of the vessel 2 and through the combustion chamber roof 26 into the combustion chamber 22. A coal feed control valve 34 in the feed pipe 32 enables the apparatus to be isolated from the coal supply.

Horizontal ducts 38 for hot combustion gases extend outwards from the upper portion of the combustion chamber 22 and through the vessel sidewalls 6. These ducts communicate with vertical ducts 40 extending downwards to respective plenum chambers 42 extending alongside the lower portions of the vessel side walls 6. A plurality of perforated sparge pipes 46 extend horizontally from the plenum chamber 42 into the respective lower regions of the compartments A and B of the vessel 2.

Figure 2:
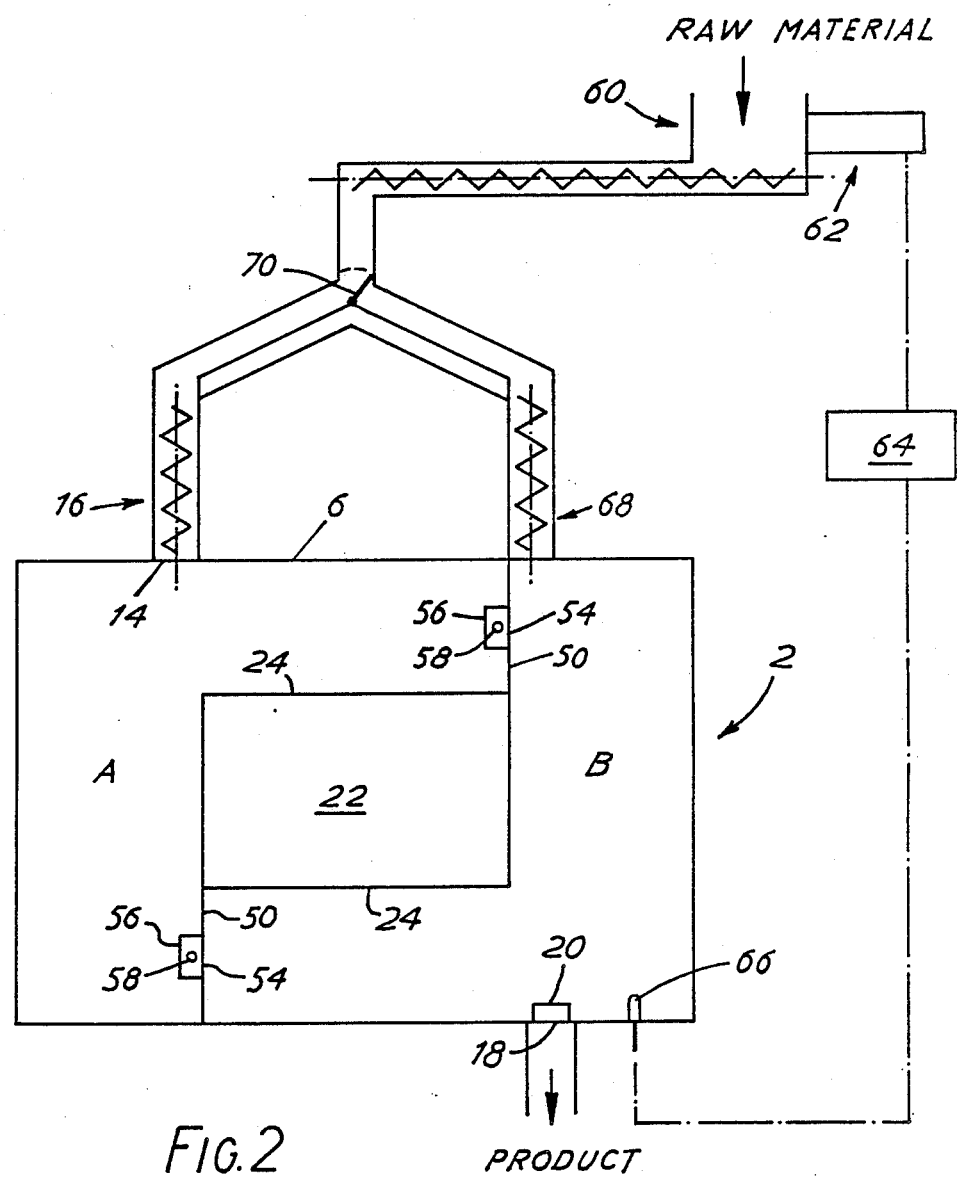
FIG. 2 is a diagrammatic view of an arrangement in plan of an apparatus incorporating the features of FIG. 1.

One arrangement of the features shown in FIG. 1 is illustrated diagrammatically by the plan of FIG. 2, in which those features are indicated by the same reference numerals. Some of the fittings are omitted for the sake of simplicity.

The two compartments A and B of the vessel 2 completely surround the combustion chamber 22, for efficient heat exchange, and are separated by partition walls 50. Each partition wall has a weir opening 54 at a height corresponding to the height of the outlet 18 to allow material from the compartment A to pass into compartment B. A vertical baffle 56 is arranged on the side of each weir in compartment A to form a duct having an inlet in the lower region of compartment A and communicating by way of the respective weir with compartment B. A compressed air feed pipe 58 extends upwards through the base of the vessel 2 into each such duct, through which compressed air can be introduced to assist the flow of material from the lower region of the compartment A up the respective duct and over the weir into compartment B.

In the arrangement shown in FIG. 2 gypsum is supplied to the screw feed 16 from a hopper 60 by means of a mechanical feed system 62 which operates in response to a controller 64 supplied with data from a thermocouple 66 in compartment B. To assist in initial loading of the calcination apparatus gypsum powder it is advantageous to have, in addition to the crew feeder 16, a second screw feeder 68 (FIG. 2) arranged to feed gypsum directly into the compartment B. A diverter 70 may be included to control the supply of gypsum to the feeders 16 and 60. Once continuous operation is established, gypsum is fed only to the bed in compartment A by means of the screw feeder 16. The bed in compartment B is then maintained by the flow of material from bed A over the weirs 54 in the partition walls 50.

In operation, once the beds A and B of powdered gypsum have been established, fuel is continuously fed through the fuel feed pipe 32 (FIG. 1) to the fluidized combustion bed in the chamber 22. Air under pressure is supplied to the tube 28 and enters the combustion chamber 22 through the stand pipes 30 to fluidize the combustion bed. The material in the beds A and B is heated by indirect heat transfer through the walls 24 of the combustion chamber, while the hot combustion gases pass along the ducts 38 and 40 into the plenum chambers 42 and are delivered through the sparge pipes 46 into the lower regions of the beds A and B. The beds are fluidized by the hot combustion gases, assisted by the vaporized water of crystallization evolved by the material, and the material is further heated. Exhaust gases and water vapor leave through the exhaust duct 12.

In continuous operation the feed rate of the gypsum is controlled to maintain the beds A and B at the optimum operating temperatures, this being most conveniently accomplished by means of the thermocouple 66 arranged to monitor the temperature of the bed B. The signal generated by the thermocouple is processed by the controller 64 to adjust the gypsum feed rate as required.

The flow rate of compressed air into the ducts 58 is adjusted to maintain a constant flow of material over the air-assisted weirs 54 from bed A to bed B and thus to maintain a constant level in bed A. The final product, for example, calcium sulphate hemihydrate, leaves the vessel 2 at the outlet weir 18.

The apparatus may be conveniently arranged and operated so that the ratio of heat input to the beds A and B is between 25:75 and 75:25, and is preferably about 50:50. The beds A and B are preferably substantially equal in size.

In practice, the bed A operates at a lower temperature than the bed B. Typically, the bed A operates in the range 120° C. to 135° C. and bed B in the range 140° C. to 160° C. Preferably, bed A is operated at about 122° C. and bed B at 148° to 150° C. The overall rate of the calcination reaction is reduced in the two stage process, as compared with a single stage calcination process, but this is achieved without necessitating a reduction in the total output of the calciner.

The product of two stage calcination contains lower levels of soluble anhydrite and residual gypsum than the single stage product. An improved quality stucco can, therefore, be achieved from two stage calcination.

The application of the process and apparatus to the calcination of gypsum is one example of the application of this invention. It will be understood that the process and apparatus can be applied to the calcination of other heat-reactive materials.

I claim:

1. An apparatus for calcining calcium sulphate dihydrate or other heat-reactive material, which comprises:
a series of containers for containing respective beds of material, each of said containers having upper and lower regions;
means for feeding untreated material into a first of said containers;
means for transferring partly calcined material from said first container to a second of said containers;
means for removing calcined material from the last container of said series;
a supply of hot gas;
ducting for bringing said hot gas into indirect heat exchange relationship with said containers;
and means for introducing said hot gas from said ducting into said lower regions of said containers for fluidization of the beds therein.

2. The apparatus according to claim 1, wherein said supply of hot gas comprises a fluidized combustion unit for a fuel, said unit being in indirect heat exchange relationship with said containers.

3. The apparatus according to claim 2, wherein said containers are disposed contiguously adjacent said combustion unit and are separated therefrom by common thermally conductive heat exchange walls.

4. The apparatus according to claim 1, wherein the means for transferring material from said first container to said second container comprises a duct, said duct having an inlet communicating with the lower region of said first container, and said duct having an outlet in the upper region of said second container.

5. The apparatus according to claim 4, further comprising means for introducing a flow of gas into said duct for assisting the movement of material from said first container to said second container.

* * * * *